March 24, 1964     C. W. BURLEY     3,126,519
ELECTRICAL TRANSDUCER
Filed Sept. 19, 1961
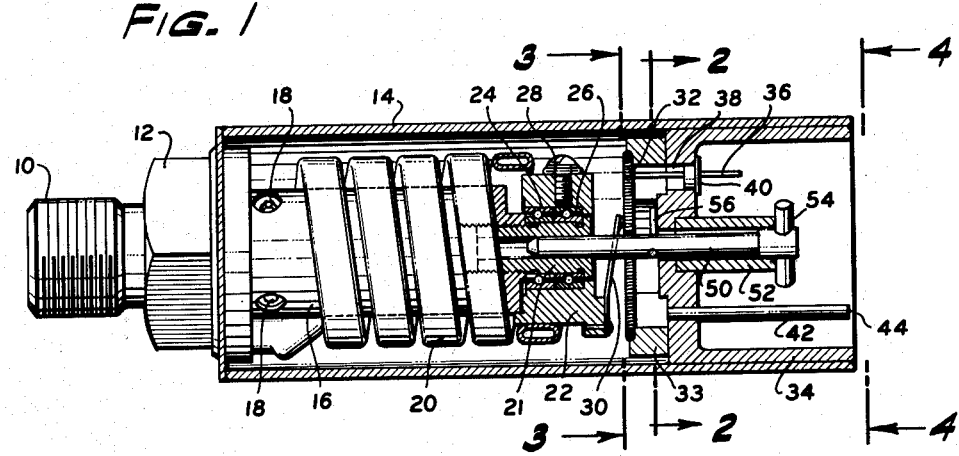
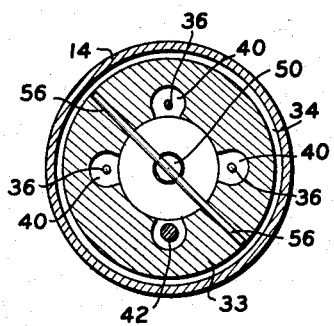
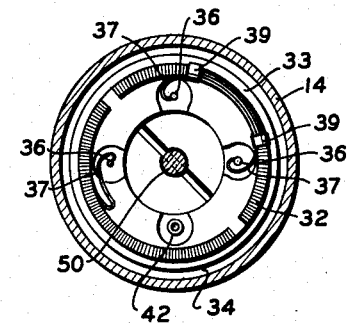
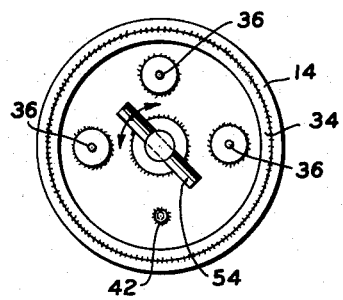
CHARLES W. BURLEY,
INVENTOR.
BY *Warren T. Jessup*
ATTORNEY

United States Patent Office 3,126,519
Patented Mar. 24, 1964

3,126,519
ELECTRICAL TRANSDUCER
Charles W. Burley, Costa Mesa, Calif., assignor to Servonic Instruments, Inc., Costa Mesa, Calif., a corporation of California
Filed Sept. 19, 1961, Ser. No. 139,145
2 Claims. (Cl. 338—40)

The present invention relates to electro-mechanical pressure measuring transducer instruments, and it relates more particularly to an improved construction which permits adjustments to be made in a hermetically sealed instrument of that general type.

The invention will be described in conjunction with a Bourdon-spring pressure gauge type of instrument. The Bourdon type of instrument uses as its sensing element a metallic tube which has a rectangular cross-section. The free end of the tube is closed, and the fluid pressure to be measured is introduced into the tube through the other end. As the pressure is increased, the tube tends to a circular cross-section and also tends to straighten out.

The motion of the free closed end of the tube in the Bourdon type of instrument is a measure of the fluid pressure. In the transducer type of instrument, a wiper arm is coupled to the free end of the tube, and the wiper arm extends into movable electrical contact with an electrical element, such as the resistance element of a potentiometer, so that the motion of the wiper arm may be converted into corresponding electrical signals.

The Bourdon pressure tube referred to above may assume any of a plurality of different configurations. The commonest forms are the C-tube, the spirial and the helical element. The embodiment of the invention to be described will be so described in conjunction with a helical tube type of instrument.

Bourdon pressure gauges of the type described above measure the difference between internal and external pressure on the Bourdon element. When the external pressure is atmospheric, the gauge reads the difference between the measured pressure and atmospheric pressure to provide gauge pressure.

In many applications it is desired that the external pressure be controlled to have a particular value, and for that reason, the Bourdon element is often enclosed in a hermetically sealed casing. The present invention is concerned with this latter type of assembly.

An object of the present invention is to provide an improved hermetically sealed pressure transducer of the type described above, and which may be conveniently adjusted to provide a desired relationship between the pressure sensitive element and the electrical element, and in which this adjustment may be achieved without destroying the hermetically sealed characteristics of the instrument.

A more general object of the invention is to provide an adjustable hermetically sealed unit which is constructed so that internal adjustments may be effectuated without breaking the hermetically sealed casing of the unit.

Further objects and advantages of the invention will become evident upon a consideration of the following description when taken in conjunction with the accompanying drawing, in which:

FIGURE 1 is a side view, partly in section, of a Bourdon tube type of pressure gauge transducer incorporating the present invention, the view of FIGURE 1 being on an enlarged scale, of the order of 2:1;

FIGURE 2 is a cross-sectional view of the unit of FIGURE 1 taken substantially on the lines 2—2 of FIGURE 1;

FIGURE 3 is a cross-sectional view of the unit of FIGURE 1 taken substantially on the lines 3—3 of FIGURE 1; and FIGURE 4 is an end view of the unit, taken from the right in FIGURE 1.

The assembly of FIGURES 1–4 includes a tubular fitting 10 which has external threads, and which is adapted to be threaded into a pipeline or other member in which the pressure of the fluid therein is to be measured or indicated. The fitting 10 has an integral head 12 which, in turn, has a hexagonal portion. A tubular casing 14 is welded, or otherwise attached, to the head 12. The head 12 closes the left hand end of the casing 14 in FIGURE 1, and these members are welded or otherwise attached to one another, so as to form a hermetic seal therebetween.

A supporting shaft 16 is rigidly mounted on the inner face of the head 12 by screws, such as the screws 18. The shaft 16 is so supported within the casing 14 in coaxial relationship therewith. A helical Bourdon tube 20 is fastened at one end to the head 12, and an appropriate passage is provided in the head to couple the interior of the tubular fitting 10 with the interior of the Bourdon tube.

The right hand end (FIGURE 1) of the shaft 16 has a reduced diameter. A bearing shaft 21 is threaded into the end of the reduced diameter portion of the shaft 16, so that the bearing shaft extends in axial alignment with the shaft 16. An annular member 22 is rotatably supported on the bearing shaft 21, the annular member being so supported by means of a pair of bearings 24 and 26.

The right hand end of the Bourdon tube 20 in FIGURE 1 is closed, and that end is attached to the annular member 22 by suitable means, such as by a screw 28. It is apparent that as the pressure of the fluid introduced into the tubular fitting 10 varies, the corresponding movement of the Bourdon tube 20 causes corresponding angular displacements of the annular member 22.

A resilient electrical potentiometer wiper arm 30 is attached to the annular member 22, and the wiper arm extends axially from the member 22 into movable electrical contact with a resistance element 32 of the potentiometer, or with any other suitable type of electrical element.

The resistance element 32 is supported on an insulating potentiometer base member 33 which, in turn, is supported in a manner to be described. As will be described, the potentiometer resistance element 32 is supported on the base member 33 for limited rotational movement with the base member with respect to the casing 14.

The potentiometer base member 33 is supported against the closed inner end of a cylindrical-shaped member 34. The member 34 closes the right hand end of the casing 14 in FIGURE 1, and the member 34 is welded to the casing 14 in a hermetically sealed relationship.

Electrical leads 36 for the resistance element 32 are brought into the interior of the casing through apertures in the closed end of the member 34, such as the apertures 38. These leads are actually brought through insulators 40 which may be formed of glass, for example, and which close the apertures, and which are sealed to the leads and to the bores of the apertures. The leads 36 are connected to selected points on the resistance element 32 by flexible leads 37 and by electrical clips 39. The flexible leads 37 permit limited rotation of the resistance element without affecting the electrical connections.

The interior of the casing 14 may be evacuated through a tube 42. The tube 42 also extends through an aperture in the closed end of the member 34, and the tube is hermetically sealed to the member. When the internal pressure of the casing 14 has been reduced to a desired value, the right hand end of the tube 42 is sealed, by solder for example, as indicated at 44.

The closed end of the member 34 has a central aperture therein, and a shaft 50 extends through the aperture and into the end of the bearing shaft 21, as shown. A hopper tube 52 extends into a counter bored portion of the central apertures in the closed end of the member 34. Tube 52 is made of a material which will yield and hence conform under external force. Soft copper is a suitable material. For the purpose of defining the term, a conformable sealing shroud tube is one which may be twisted within the limits of destruction of the supporting elements with which it is associated, and which will yield under such twisting force to a new conforming position. The elastic limit is such that it may be deformed with relative ease to allow rotation of shaft 50, but pliable enough to prevent rupture within the necessary limits of rotation.

The tube 52 is welded to the closed end of the member 34 in hermetically sealed relationship. The tube 52 extends outwardly from the closed end of the member 34 in coaxial relationship, and the shaft 50 extends out through the tube 52. The right hand end of the shaft 50 has an adjusting cross-bar, or stub, 54 attached to it, and the cross-bar and end of the shaft are welded to the tube 54 in hermetically sealed relationship.

In the manner described above, the shaft 50 is supported by the tube 52 in the end wall of the member 34 and by the bearing shaft 21. The shaft 50, in turn, supports the insulating member 33 by means of a pin 56. The pin 56 extends radially from the shaft 50 and into the base member 33.

With the construction described above, limited rotational motion may be imparted to the base member 33 and, therefore, to the resistance element 32. This limited rotational motion may be so imparted to the elements 32 and 33, merely by grasping the adjustment cross-bar 54 and manually turning the adjustment shaft 50. The tube 52 is yieldable, as described above, so that the adjustment may be carried out without destroying the hermetically sealed characteristics of the unit. The unit may be partially oil filled in accordance with usual practice, if so desired.

The invention provides, therefore, an improved construction for a hermetically sealed unit by which internal adjustments may be made without destroying the hermetically sealed characteristics of the unit. In the illustrated embodiment, a desired initial adjustment may be made between the resistance element 32 and the wiper arm 30 so as to establish the initial calibrated meter readings of the associated electrical indicating instruments. Moreover, and as described above, this adjustment may be achieved in a simple manner, and without affecting the true hermetically sealed characteristics of the unit.

What is claimed is:

1. In a pressure indicating instrument of the type described, and which includes a hermetically sealed casing, a pressure responsive element supported in the casing and movable in accordance with pressure variations to be indicated by the instrument, an electrical element supported in the casing by an insulating member which is rotatably mounted with respect to said casing, a wiper arm coupled to said pressure responsive element and extending into arcuately movable electrical contact with said electrical element, the combination of: an adjustment shaft extending through the casing and through the electrical element, means including a pin extending radially from said adjustment shaft into said insulating member supporting said electrical element for mechanically coupling said adjustment shaft to said electrical element for imparting limited rotational motion to the electrical element with respect to said wiper arm upon rotation of said adjustment shaft, and a conformable sealing shroud tube mounted externally of said casing and surrounding said shaft and hermetically sealed at one end to said shaft and at the other end to said casing to permit limited rotational adjustment of said shaft.

2. In a pressure indicating instrument of the type described, and which includes a hermetically sealed casing, a pressure responsive element supported in the casing and movable in accordance with pressure variations to be indicated by the instrument, an electrical element consisting of a potentiometer resistance supported in the casing by an insulating member which is rotatably mounted with respect to said casing, a wiper arm coupled to said pressure responsive element and extending into arcuately movable electrical contact with said electrical element, the combination of: an adjustment shaft extending through the casing and through the electrical element, means including a pin extending radially from said adjustment shaft into said insulating member supporting said electrical element for mechanically coupling said adjustment shaft to said electrical element for imparting limited rotational motion to the electrical element with respect to said wiper arm upon rotation of said adjustment shaft, and a conformable sealing shroud tube mounted externally of said casing and surrounding said shaft and hermetically sealed at one end to said shaft and at the other end to said casing to permit limited rotational adjustment of said shaft.

References Cited in the file of this patent

UNITED STATES PATENTS

| | | |
|---|---|---|
| 2,120,100 | Illgen | June 7, 1938 |
| 2,551,793 | De Giers et al. | May 8, 1951 |
| 2,601,678 | Beatty | June 24, 1952 |
| 2,739,211 | De Julio | Mar. 20, 1956 |
| 2,842,969 | Baker | July 15, 1958 |
| 2,976,506 | Bourns | Mar. 21, 1961 |